United States Patent
Nagayama et al.

(10) Patent No.: US 9,337,469 B2
(45) Date of Patent: May 10, 2016

(54) LIQUID-INJECTION-TYPE AIR BATTERY, LIQUID-INJECTION-TYPE AIR BATTERY PACK, AND METHOD FOR USING LIQUID-INJECTION-TYPE AIR BATTERY OR LIQUID-INJECTION-TYPE AIR BATTERY PACK

(75) Inventors: Mori Nagayama, Yokohama (JP); Yoshiko Tsukada, Yokohama (JP); Nobutaka Chiba, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 182 days.

(21) Appl. No.: 14/125,735

(22) PCT Filed: Mar. 2, 2012

(86) PCT No.: PCT/JP2012/055356
§ 371 (c)(1),
(2), (4) Date: Dec. 12, 2013

(87) PCT Pub. No.: WO2012/172837
PCT Pub. Date: Dec. 20, 2012

(65) Prior Publication Data
US 2014/0120430 A1    May 1, 2014

(30) Foreign Application Priority Data

Jun. 13, 2011  (JP) ................ 2011-131240

(51) Int. Cl.
| | |
|---|---|
| H01M 6/30 | (2006.01) |
| H01M 6/32 | (2006.01) |
| H01M 2/36 | (2006.01) |
| H01M 12/06 | (2006.01) |
| H01M 6/38 | (2006.01) |
| H01M 2/10 | (2006.01) |
| H01M 4/38 | (2006.01) |
| H01M 2/38 | (2006.01) |

(52) U.S. Cl.
CPC ................ *H01M 2/36* (2013.01); *H01M 2/361* (2013.01); *H01M 2/362* (2013.01); *H01M 6/38* (2013.01);
(Continued)

(58) Field of Classification Search
USPC .................................... 429/118, 63, 406, 405
IPC .................................................. H01M 6/30,6/32
See application file for complete search history.

(56) References Cited

U.S. PATENT DOCUMENTS 5,415,949 A * 5/1995 Stone et al. ..................... 429/63
5,445,901 A    8/1995 Korall et al.
(Continued)

FOREIGN PATENT DOCUMENTS

JP    57-168180 U    10/1982
JP    2002-151167 A    5/2002
(Continued)

OTHER PUBLICATIONS

Supplementary European Search Report dated Feb. 2, 2015, 6 pgs.

*Primary Examiner* — Patrick Ryan
*Assistant Examiner* — Julian Anthony
(74) *Attorney, Agent, or Firm* — Foley & Lardner LLP

(57) ABSTRACT

Provided are a liquid activated air battery and an assembled liquid activated air battery, which can be reduced in size, as well as a method of using the liquid activated air battery and the assembled liquid activated air battery. The liquid activated air battery includes: an electrode assembly comprising a cathode and an anode; and a space that serves as a liquid container to store a liquid component of an electrolyte of the air battery before injection and also serves as a gas flowing member through which oxygen-containing gas of an active material of the air battery flows after injection. The assembled liquid activated air battery includes a plurality of the liquid activated air battery.

20 Claims, 6 Drawing Sheets

(52) U.S. Cl.
CPC ............ *H01M 12/06* (2013.01); *H01M 2/1094* (2013.01); *H01M 2/38* (2013.01); *H01M 4/38* (2013.01); *H01M 6/32* (2013.01); *H01M 2300/0025* (2013.01); *Y02E 60/50* (2013.01)

(56) References Cited

U.S. PATENT DOCUMENTS 5,729,891 A * 3/1998 Richiardone et al. ........ 29/623.2

| | | |
|---|---|---|
| 2004/0224195 A1 | 11/2004 | Huang |
| 2010/0021806 A1 | 1/2010 | Simon et al. |

FOREIGN PATENT DOCUMENTS

| | | |
|---|---|---|
| JP | 2005-527069 A | 9/2005 |
| JP | 2008-181853 A | 8/2008 |
| JP | 2008-535156 A | 8/2008 |
| WO | WO 03/058736 A1 | 7/2003 |
| WO | WO 2006/101280 A1 | 9/2006 |

* cited by examiner

LIQUID-INJECTION-TYPE AIR BATTERY, LIQUID-INJECTION-TYPE AIR BATTERY PACK, AND METHOD FOR USING LIQUID-INJECTION-TYPE AIR BATTERY OR LIQUID-INJECTION-TYPE AIR BATTERY PACK

TECHNICAL FIELD

The present invention relates to a liquid activated air battery, an assembled liquid activated air battery, and a method of using the liquid activated air battery or the assembled liquid activated air battery.

In more detail, the present invention relates to a liquid activated air battery that can be reduced in size, an assembled liquid activated air battery that includes a plurality of the liquid activated air battery, and a method of using the liquid activated air battery or the assembled liquid activated air battery.

BACKGROUND ART

Proposals have been made to improve air batteries aimed at easy operation which does not require for a user to directly touch the electrolytic solution and reliable operation even in an emergency (see Patent Literature 1).

The disclosed air battery includes a plurality of unit cells combined together to compose an assembled battery, an electrolytic solution container with electrolytic solution therein, and a battery container configured to hold the electrolytic solution so that the assembled battery is immersed therein to generate electric power.

CITATION LIST

Patent Literature

Patent Literature 1: JP 2002-151167A

SUMMARY OF INVENTION

Technical Problem

However, the air battery disclosed in Patent Literature 1 has a problem that the space for the electrolytic solution container becomes a dead space after injection, which results in the large overall size of the liquid activated air battery.

The present invention was made in view of such a problem of the prior art.

It is an object of the present invention to provide a liquid activated air battery that can be reduced in size, an assembled liquid activated air battery including a plurality of the liquid activated air batteries, and a method of using the liquid activated air battery or the assembled liquid activated air battery.

Solution to Problem

The present inventors made a diligent research for solving the above-described problem.

As a result, they found that the above-described object is accomplished by effectively utilizing the space for the liquid container that stores a liquid component of the electrolyte of the air battery. The present invention was thus completed.

That is, the liquid activated air battery of the present invention includes: an electrode assembly including a cathode and an anode; and a space that serves as a liquid container to store a liquid component of an electrolyte of the air battery before injection and also serves as a gas flowing member through which oxygen-containing gas of an active material of the air battery flows after the injection.

Further, the assembled liquid activated air battery of the present invention includes a plurality of the liquid activated air battery of the present invention.

Further, the method of using a liquid activated air battery or an assembled liquid activated air battery includes the steps of: supplying an electrode assembly with a liquid component of an electrolyte of the air battery from a liquid container to store the liquid component before injection; and thereafter supplying the liquid container with oxygen-containing gas of an active substance of the air battery when an amount of the liquid component in the liquid container reaches a predetermined level, wherein the liquid container also serves as a gas flowing member through which the oxygen-containing gas flows.

Advantageous Effect of Invention

According to the present invention, the electrode assembly includes the cathode and the anode, and the space serves as the liquid container to store the liquid component of the electrolyte of the air battery before injection and also serves as the gas flowing member through which the oxygen-containing gas of an active substance of the air battery flows after injection.

As a result, it becomes possible to provide a liquid activated air battery that can be reduced in size, an assembled liquid activated air battery including a plurality of these batteries and a method of using the liquid activated air battery or the assembled liquid activated air battery.

DESCRIPTION OF EMBODIMENTS

Figure 1:
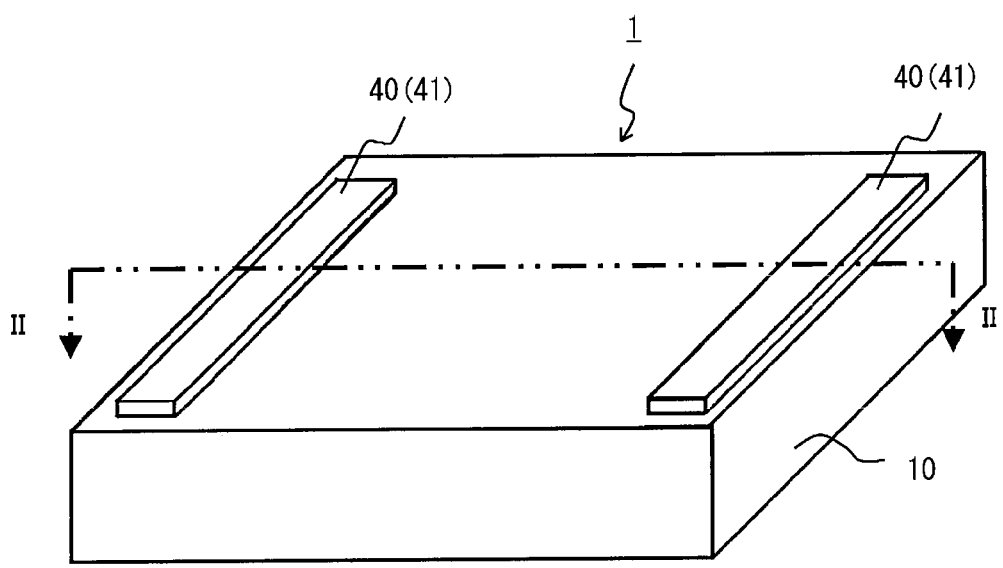
FIG. 1 is a schematic perspective view of a liquid activated air battery according to a first embodiment of the present invention.

Hereinafter, the liquid activated air battery, the assembled liquid activated air battery and the method of using the liquid activated air battery or the assembled liquid activated air battery of the present invention will be described in detail.

First, a liquid activated air battery according to an embodiment of the present invention will be described in detail.

The liquid activated air battery of this embodiment includes: an electrode assembly including a cathode and an anode; and a space that serves as a liquid container to store a liquid component of an electrolyte of the air battery before injection and also serves as a gas flowing member through which oxygen-containing gas of an active substance of the air battery flows after injection.

With this configuration, the liquid container to store the liquid component of the electrolyte of the air battery before injection can be diverted to the gas flowing member to supply the air battery with the oxygen-containing gas after injection. As a result, the liquid activated air battery can be reduced in size.

That is, the liquid container is a necessary space for storing the liquid component of the electrolyte before activating the liquid activated air battery, while the liquid container becomes a dead space once the liquid component is injected to activate the battery because it becomes empty.

On the other hand, the gas flowing member, which supplies the cathode of the air battery with the oxygen-containing gas (e.g. air), remains a dead space before activating the battery because it is not utilized at all, while it becomes a necessary space once the liquid is injected to activate the battery.

Thus, the liquid container and the gas flowing member have exactly complementary relationship to each other in terms of the status of use (before and after injection).

Based on this, an electrode assembly absent portion can be utilized as the liquid container or the gas flowing member according to the status of use (before and after injection). As a result, the liquid activated air battery can be reduced in size.

Further, it is preferred that the liquid activated air battery of this embodiment further includes a liquid-tight/gas-permeable member on the surface of the cathode, the surface facing the space.

This configuration enables proper arrangement of the electrode assembly and the space that serves as the liquid container before injection and serves as the gas flowing section after injection. As a result, the liquid activated air battery can be further reduced in size.

Further, it is preferred that the liquid activated air battery of this embodiment further includes: a liquid supply controller to supply the electrode assembly with the liquid component from the liquid container; and an oxygen-containing gas supply controller to supply the oxygen-containing gas when an amount of the liquid component in the liquid container reaches a predetermined level.

With this configuration, the single space can serve as both of the liquid container before injection and the gas flowing member after injection. As a result, the liquid activated air battery can be further reduced in size.

Further, it is preferred that the liquid activated air battery of this embodiment further includes: a housing including an electrode assembly holding portion and an electrode assembly absent portion inside the housing; the electrode assembly including the cathode and the anode; the liquid-tight/gas-permeable member placed facing the cathode inside the housing; the liquid supply controller provided in the housing; and the oxygen-containing gas supply controller provided in the housing.

Further in the liquid activated air battery of this embodiment, it is preferred that the liquid-tight/gas-permeable member partitions at least a portion of the inside of the housing into the electrode assembly holding portion and the electrode assembly absent portion.

Further in the liquid activated air battery of this embodiment, it is preferred that the electrode assembly absent portion serves as the liquid container to store the liquid component of the electrolyte of the air battery.

Further in the liquid activated air battery of this embodiment, it is preferred that after the liquid component is supplied to the electrode assembly by the liquid supply controller, the electrode assembly absent portion serves as the gas flowing member through which the oxygen-containing gas flows.

Further in the liquid activated air battery of this embodiment, it is preferred that the oxygen-containing gas supply controller controls supply of the oxygen-containing gas from the outside of the housing to the gas flowing member.

With these configurations, the liquid container to store the liquid component of the electrolyte of the air battery before injection can be diverted to the gas flowing member to supply the air battery with the oxygen-containing gas after injection. Further, these configurations enable proper arrangement of the electrode assembly and the space that serves as the liquid container before injection and serves as the gas flowing member after injection, and can also enable the single space to serve as both of the liquid container before injection and the gas flowing member after injection. As a result, the liquid activated air battery can be further reduced in size.

In the present invention, the liquid-tight/gas-permeable member reduces or prevents the electrolytic solution of the air battery from leaking by its water-repellant property for example, and also forms a three-phase boundary on the cathode to improve the reactivity. Further, it has a porous structure for example, so that gas can flow through it relatively easily.

That is, when the electrolytic solution is held in the liquid container of the electrode assembly absent portion that is hermetically sealed with an air vent valve or the like described below, the electrolytic solution is prevented from penetration by the action of the liquid-tight/gas-permeable member. Accordingly, the air battery cannot be activated in this state. Then, when the electrolytic solution is delivered to the electrode assembly through a flow path that goes around the liquid-tight/gas-permeable member, the liquid container of the electrode assembly absent portion loses the stored electrolytic solution while it receives air that was originally contained in the electrode assembly holding portion. Then, by opening the air vent valve described below in this state, flow of the oxygen-containing gas is established to activate the air battery.

Next, a liquid activated air batteries according to embodiments of the present invention will be described in detail with reference to the drawings. The scale of the drawings that are referred to in the following embodiments includes some exaggeration for descriptive reasons, and may thus be different from the actual dimension.

First Embodiment

Figure 2:
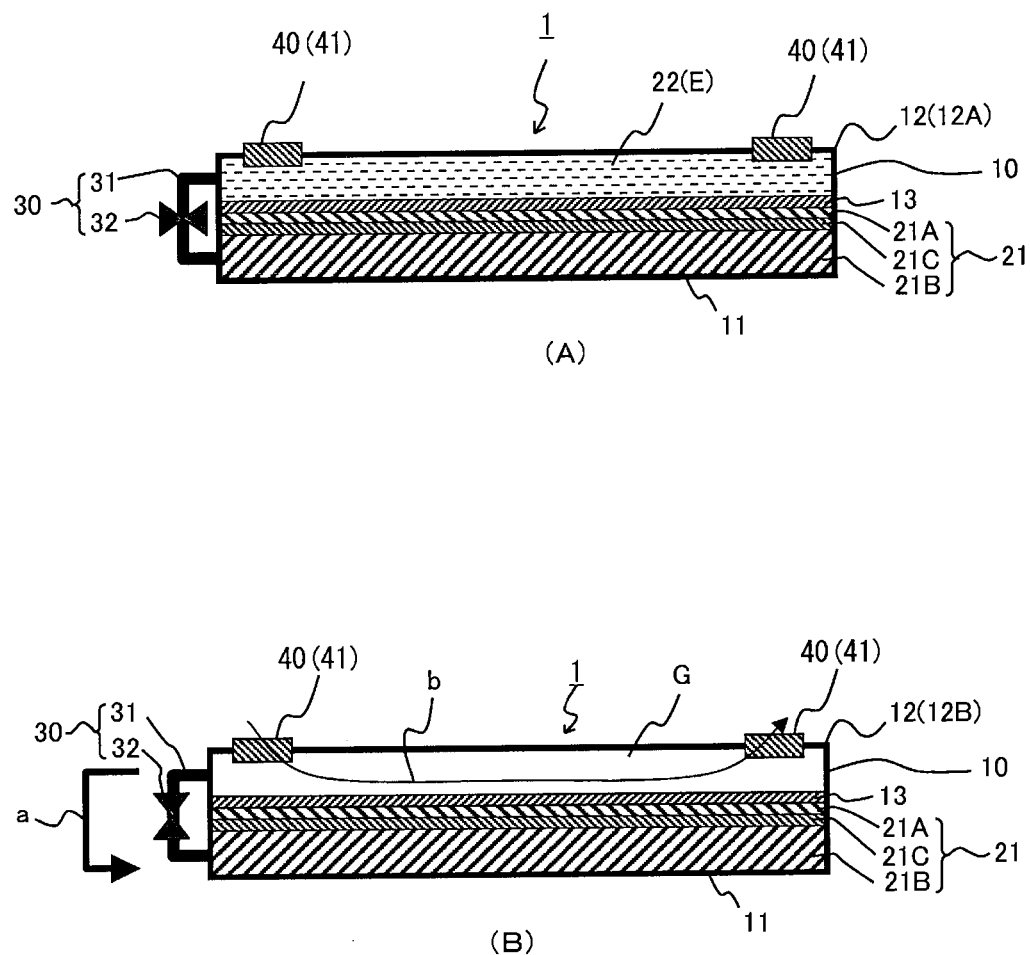
FIG. 2 is a schematic cross sectional view of the liquid activated air battery of FIG. 1 along the line II-II.

FIG. 1 is a schematic perspective view of a liquid activated air battery of a first embodiment. Further, FIG. 2 is a schematic cross sectional view of the liquid activated air battery of FIG. 1 along the line II-II. The arrows (a) and (b) in FIG. 2(B) denote the flow directions of a liquid component of an electrolyte and oxygen-containing gas respectively.

As illustrated in FIGS. 1 and 2, the liquid activated air battery 1 of the first embodiment includes: a housing 10 including an electrode assembly holding portion 11 and an electrode assembly absent portion 12 therein; an electrode assembly 21 placed inside the housing 10, including a cathode 21A, an anode 21B and a separator 21C; a liquid component 22 of the electrolyte of the air battery 1 placed inside the housing 10; a liquid-tight/gas-permeable member 13 placed inside the housing 10 in such a way the liquid-tight/gas-permeable member faces the cathode 21A; a liquid supply controller 30 provided in the housing 10; and an oxygen-containing gas supply controller 40 provided in the housing 10.

The liquid-tight/gas-permeable member 13 is made of water repellant porous resin, which is one of the exemplary materials, and partitions at least a part of the inside of the housing 10 into the electrode assembly holding portion 11 where the electrode assembly 21 is held and the electrode assembly absent portion 12 where the electrode assembly 21 is not held.

The electrode assembly absent portion 12 serves as a liquid container 12A to store a liquid electrolyte (electrolytic solution) E, which is an example of the liquid component 22 (see FIG. 2(A)).

The liquid supply controller 30 is composed of a channel 31 and a valve 32, and controls supply of the electrolytic solution E from the liquid container 12A to the electrode assembly 21 by opening/closing the valve 32 or the like. Specifically, it opens the valve to start injection, and closes the valve to stop injection. At this moment, air or the like that is originally contained in the electrode assembly holding portion is brought to the electrode absent portion.

After the electrolytic solution E is supplied to the electrode assembly 21, the electrode assembly absent portion 12 serves as a gas flowing member 12B through which the oxygen-containing gas G flows (see FIG. 2(B)).

Further, the oxygen-containing gas supply controller 40 is composed of an air vent valve 41, and controls supply of the oxygen-containing gas G from the outside of the housing 10 to the gas flowing member 12B by opening/closing the air vent valve 41 or the like.

With this configuration, the liquid container to store the electrolytic solution of the electrolyte of the air battery before injection can be diverted to the gas flowing member to supply the air battery with the oxygen-containing gas after injection. As a result, the liquid activated air battery can be reduced in size.

Further, this configuration enables proper arrangement of the electrode assembly and the space that serves as the liquid container before injection and also serves as the gas flowing member after injection. As a result, the liquid activated air battery can be reduced in size.

Further, with this configuration, the single space can serve as both of the liquid container before injection and the gas flowing member after injection. As a result, the liquid activated air battery can be reduced in size.

Hereinafter, each component will be described in detail.
(Housing 10)

The housing 10 is partitioned into the electrode assembly holding portion 11 and the electrode assembly absent portion 12 by the liquid-tight/gas-permeable member 13.

The housing 10 is made of, for example, metal material such as stainless steel (SUS) or copper (Cu). However, the present invention is not limited thereto. For example, plastic materials such as hard polyvinyl chloride may be employed. An aluminum laminate film may be employed, too.

It is noted that because the electrolytic solution may be strong alkaline, corrosion-resistant materials are preferred among conventionally known materials of air batteries.
(Electrode Assembly 21)

The electrode assembly 21 includes a layered separator 21C and a layered cathode 21A and a layered anode 22B sandwiching therebetween the layered separator 21C. They are laminated with one another.

The cathode 21A contains, for example, a catalyst and a conductive catalyst carrier that supports the catalyst. Hereinafter, such a composite of a supported catalyst and a catalyst carrier is also referred to as an "electrode catalyst".

Specifically, the catalyst may be selected from metals such as platinum (Pt), ruthenium (Ru), iridium (Ir), rhodium (Rh), palladium (Pd), osmium (Os), tungsten (W), lead (Pd), iron (Fe), chromium (Cr), cobalt (Co), nickel (Ni), manganese (Mg), vanadium (V), molybdenum (Mo), gallium (Ga), aluminum (Al), alloys of these metals and the like.

As used herein, the term "alloy" is a generic term for a substance that is composed of a metal element and one or more other metal or non-metal element added thereto and that has metallic characteristics. In terms of the structure, alloys include eutectic alloys, which are a mixture of crystals of the individual elements, solid solutions where the elements are completely dissolved to each other, metal-metal or metal-non-metal compounds of the elements, and the like. The present invention may employ any of them.

The catalyst is not particularly limited regarding its size and shape, and the same size and shape as those of conventionally known catalysts may be employed. However, it is preferred that the catalyst has a globular shape. It is also preferred that the catalyst particles have an average particle size of 1 to 30 nm. With the catalyst particles having an average particle size within this range, it is possible to correctly control the balance between ease of support and the catalyst utilization ratio, which relates to the effective electrode area where an electrochemical reaction occurs.

In the present invention, the "average particle size of the catalyst particles" may be measured as the crystallite size that is determined by the full width at half maximum of the diffraction peak derived from the catalyst by X-ray diffractometry, or as the average size of the catalyst particles that are observed in an transmission electron microscopic image.

The catalyst carrier functions as a carrier that supports the catalyst, and also functions as an electron transfer path that is involved in transfer of electrons between the catalyst and the other member. The catalyst carrier is only required to have a specific surface area large enough to support the catalyst in a desired dispersed condition and to have sufficient electron conductivity. It is preferred that its main ingredient is carbon.

Specifically, the catalyst carrier may be made of carbon particles of carbon black, activated carbon, coke, natural or artificial graphite, or the like. As used herein, the phrase "the main ingredient is carbon" means that the catalyst carrier contains carbon atoms as its main ingredient, and includes both meanings of "consisting of carbon atoms" and "substantially consisting of carbon atoms". The phrase "substantially consisting of carbon atoms" means inclusion of impurities is permitted up to 2 to 3 mass %.

The BET specific surface area of the catalyst carrier may be any value as long as it is large enough to support the catalyst in a highly dispersed condition, and is preferably 20 to 1600 $m^2/g$, more preferably 80 to 1200 $m^2/g$. With the surface specific area of the catalyst carrier within this range, it is possible to correctly control the balance between the dispersion degree of the catalyst on the catalyst carrier and the catalyst utilization ratio.

The average particle size of the catalyst carrier is not particularly limited either, and is preferably approximately 5 to 200 nm, more preferably approximately 10 to 100 nm in terms of ease of support, the catalyst utilization ratio and keeping the thickness of the catalyst layer within a suitable range.

The electrode catalyst, which is composed of the supported catalyst and the catalyst carrier, has a supported catalyst content of preferably 10 to 80 mass %, more preferably 30 to 70 mass % with respect to the total amount of the electrode catalyst. With the supported catalyst content within this range, it is possible to correctly control the dispersion degree of the catalyst on the catalyst carrier and the performance of the catalyst. The supported catalyst content of the electrode catalyst may be measured by inductively coupled plasma optical emission spectrometry (ICP).

However, the present invention is not limited thereto, and may employ conventionally known materials of air batteries.

The anode 21B contains an anode active material that is a simple substance or alloy of a base metal, which has a lower normal electrode potential than hydrogen.

Such base metals having a lower normal electrode potential than hydrogen include, for example, zinc (Zn), iron (Fe), aluminum (Al), magnesium (Mg), manganese (Mn), silicon (Si), titanium (Ti), chromium (Cr), vanadium (V) and the like. Alloys of any of these metals with one or more of other metal or non-metal element added thereto are also included. In terms of the structure, alloys include eutectic alloys, which are a mixture of crystals of the individual elements, solid solutions where the elements are completely dissolved to each other, metal-metal or metal-non-metal compounds of the elements, and the like, which is already described above.

However the present invention is not limited thereto, and may employ conventionally known materials of air batteries.

The separator 21C may be made of glass fiber paper without water repellant treatment, fine porous membrane of polyolefin such as polyethylene and polypropylene, or the like.

However, the present invention is not limited thereto, and may employ conventionally known materials of air batteries.

(Liquid Component 22)

The liquid component 22 is stored in the electrode assembly absent portion 12 before injection.

The liquid electrolyte (electrolytic solution) E of the liquid component 22 may be aqueous solution of, for example, potassium chloride, sodium chloride, potassium hydroxide or the like. However, the present invention is not limited thereto, and may employ conventionally known electrolytic solutions of air batteries.

If the liquid component is the electrolytic solution itself, there is an advantage that the electrode assembly is supplied with the liquid component (electrolytic solution) that is prepared beforehand and thereby has a uniform concentration.

(Liquid-Tight/Gas-Permeable Member 13)

The liquid-tight/gas-permeable member 13 is placed facing the cathode 21A, and partitions at least a part of the inside of the housing 10 into the electrode assembly holding portion 11 where the electrode assembly 21 is held and the electrode assembly absent portion 12 where the electrode assembly 11 is not held.

By utilizing the liquid-tight/gas-permeable member, placed on the cathode, as a part of the liquid container, the present invention can accomplish size reduction of the liquid activated air battery.

As described above, the liquid-tight/gas-permeable member reduces or prevents the electrolytic solution in the air battery from leaking by its water repellent property for example, and also forms a three-phase boundary on the cathode to improve the reactivity. Further, it has a structure that allows gas to flow through it relatively easily, e.g. porous structure.

That is, when the electrolytic solution is held in the liquid container of the electrode assembly absent portion that is hermetically sealed by an air vent valve or the like described below, the electrolytic solution is prevented from penetration by the action of the liquid-tight/gas-permeable member. Accordingly, the air battery cannot be activated in this state. Then, when the electrolytic solution is delivered to the electrode assembly through a flow path that goes around the liquid-tight/gas-permeable member, the liquid container of the electrode assembly absent portion loses the stored electrolytic solution while it receives the air that was originally contained in the electrode assembly holding portion. Then, by opening the air vent valve described below in this state, flow of the oxygen-containing gas is established to activate the air battery.

The liquid-tight/gas-permeable member 13 is made of, for example, water-repellant porous resin. Preferred examples of such water-repellant porous resins include polyolefin, fluororesin, resins that contain at least one of these resins, and the like.

(Liquid Supply Controller 30)

The liquid supply controller 30 is composed of a channel 31 and a valve 32, and controls supply of the electrolytic solution E from the liquid container 12A to the electrode assembly 21 by opening/closing the valve 32 or the like.

It is preferable that the channel 31 and the valve 32 are made of the same material as that of the housing, but the material is not limited thereto. Further, the liquid supply controller 30 may be further provided with a liquid supply pump and the like.

(Oxygen-Containing Gas G)

Representative examples of oxygen-containing gas G include oxygen and air. However, the present invention is not limited thereto, and may employ conventionally known oxygen-containing gas used in air batteries.

(Oxygen-Containing Gas Supply Controller 40)

The oxygen-containing gas supply controller 40 is composed of the air vent valve 41, and controls supply of the oxygen-containing gas G from the outside of the housing 10 to the gas flowing member 12B by opening/closing the air vent valve 41 or the like.

It is preferable that the air vent valve 41 is made of the same material as that of the housing, but the material is not limited thereto. Further, the oxygen-containing gas supply controller 40 may be provided with an oxygen-containing gas supply fan or the like.

Second Embodiment

Figure 3:
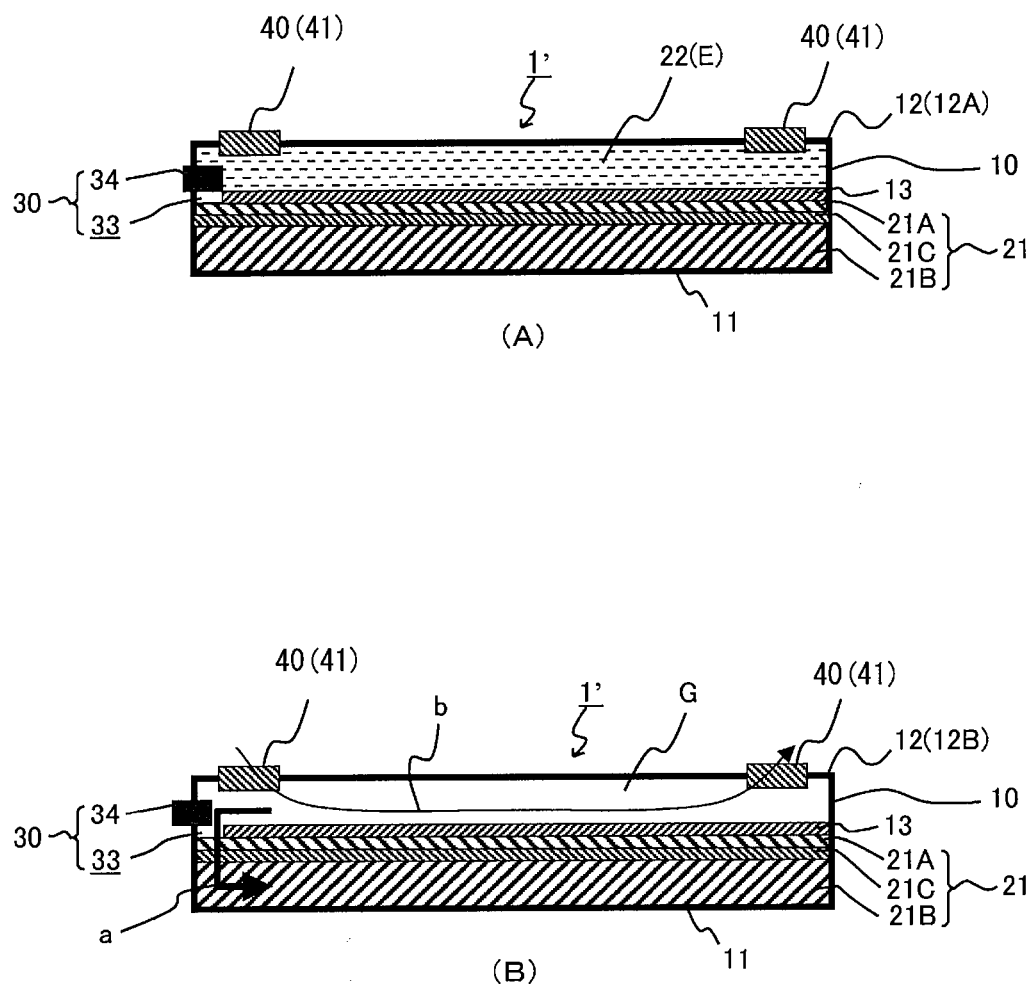
FIG. 3 is a schematic cross sectional view of the liquid activated air battery according to a second embodiment of the present invention.

FIG. 3 is a schematic cross sectional view of a liquid activated air battery according to a second embodiment. In FIG. 3(B), the arrows (a) and (b) denote the flow directions of a liquid component of an electrolyte and oxygen-containing gas respectively. The same components as those of the above-described first embodiment are referred to by the same reference signs, and the descriptions thereof are omitted.

As illustrated in FIG. 3, the liquid activated air battery 1' of the second embodiment is different from the above-described liquid activated air battery of the first embodiment in the configuration of the liquid supply controller 30.

Specifically, this embodiment employs a cut-off channel 33 provided on a part of the liquid-tight/gas-permeable member 13, and supply of electrolytic solution E from a liquid container 12A to an electrode assembly 21 is controlled by opening/closing a sliding valve 34.

With this configuration, the liquid container to store the electrolytic solution of an electrolyte of the air battery before injection can be diverted to a gas flowing member to supply oxygen-containing gas after injection. As a result, the liquid activated air battery can be reduced in size.

Further, this configuration enables proper arrangement of the electrode assembly and the space that serves as the liquid container before injection and also serves as the gas flowing member after injection. As a result, the liquid activated air battery can be reduced in size.

Further, with this configuration, the single space can serve as both of the liquid container before injection and the gas flowing member after injection. As a result, the liquid activated air battery can be reduced in size.

Furthermore, while the surface area of the liquid-tight/gas-permeable member is decreased, which is the supply route of the oxygen-containing gas to the cathode of the air battery, this embodiment does not require a channel or valve outside the housing. As a result, the liquid activated air battery can be further reduced in size.

Third Embodiment

Figure 4:
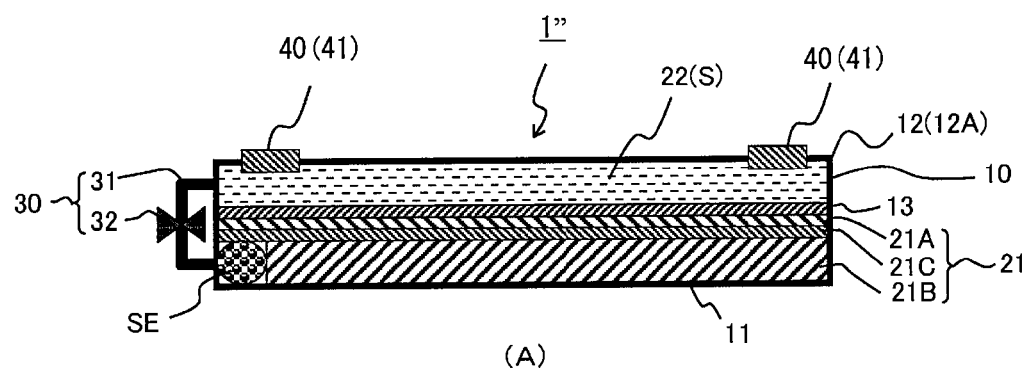
FIG. 4 is a schematic cross sectional view of a liquid activated air battery according to a third embodiment of the present invention.
Figure 4:
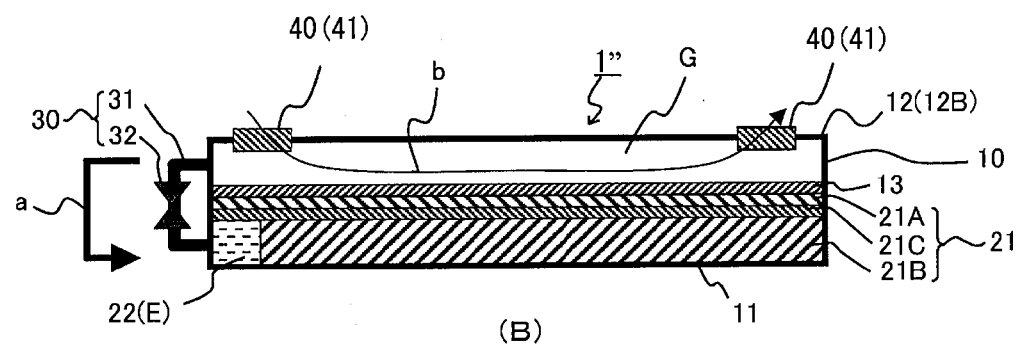

FIG. 4 is a schematic cross sectional view of a liquid activated air battery of a third embodiment. In FIG. 4(B), the arrows (a) and (b) denote the flow directions of a liquid component of the electrolyte and oxygen-containing gas respectively. The same components as those of the above-described first embodiment are referred to by the same reference signs, and the descriptions thereof are omitted.

As illustrated in FIG. 4, the liquid activated air battery 1″ of the third embodiment is different from the above-described liquid activated air battery of the first embodiment in the composition of the stored liquid component of the electrolyte.

Specifically, this embodiment employs solvent S as the liquid component 22 of the electrolyte, and separately includes an electrolytic salt component SE of the electrolyte in a housing (electrode assembly holding portion).

With this configuration, a liquid container to store the electrolytic solution of the electrolyte of the air battery before injection can be diverted to a gas flowing member to supply oxygen-containing gas after injection. As a result, the liquid activated air battery can be reduced in size.

Further, this configuration enables proper arrangement of an electrode assembly and the space that serves as the liquid container before injection and also serves as the gas flowing member after injection. As a result, the liquid activated air battery can be reduced in size.

Further, with this configuration, the single space can serve as both of the liquid container before injection and the gas flowing member after injection. As a result, the liquid activated air battery can be reduced in size.

Furthermore, while the surface area of an anode of the air battery is decreased, the liquid component can be stored, for example, in a neutral condition since it is solvent. As a result, there is an advantage that material design of a housing, in particular an electrode assembly absent portion, is more flexible.

The solvent S of the liquid component 22 may be water or the like for example. However, the present invention is not limited thereto, and may employ conventionally known solvents for electrolytes of air batteries.

The electrolytic salt may be, for example, potassium chloride, sodium chloride, potassium hydroxide or the like.

Next, an assembled liquid activated air battery according to an embodiment of the present invention will be described in detail.

The assembled liquid activated air battery of this embodiment includes a plurality of the liquid activated air batteries of any of the above-described embodiments.

With this configuration, a liquid container to store electrolytic solution of an electrolyte of the air battery before injection can be diverted to a gas flowing member to supply oxygen-containing gas after injection, for example. As a result, the assembled liquid activated air battery can be reduced in size.

Next, an assembled liquid activated air battery according to an embodiment of the present invention will be described in detail with reference to the drawings. The scale of the drawings that are referred to in the following embodiment includes some exaggeration for descriptive reasons, and may thus be different from the actual dimension.

Fourth Embodiment

Figure 5:
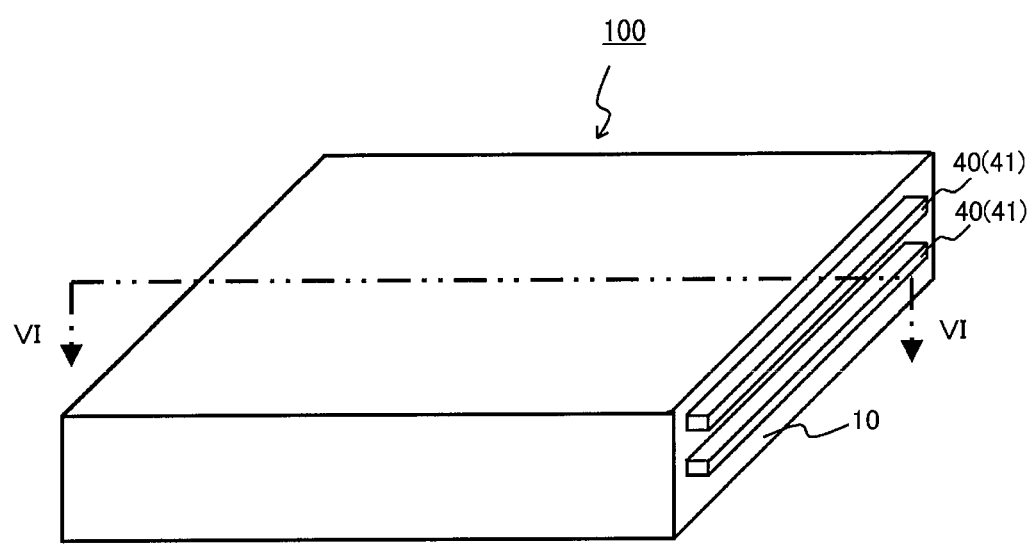
FIG. 5 is a schematic perspective view of an assembled liquid activated air battery according to a fourth embodiment of the present invention.
Figure 6:
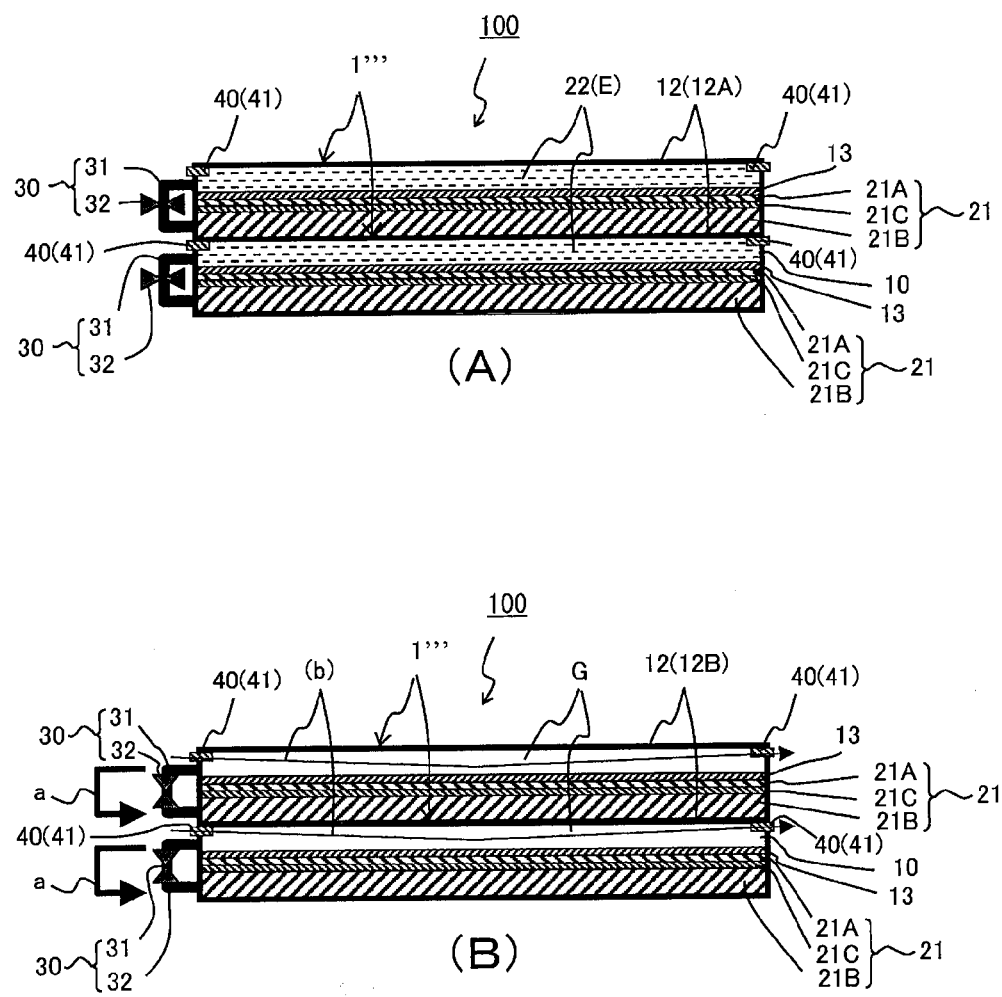
FIG. 6 a is schematic cross sectional view of the liquid activated air battery of FIG. 5 along the line VI-VI.

FIG. 5 is a schematic perspective view of an assembled liquid activated air battery according to a fourth embodiment. Further, FIG. 6 is a schematic cross sectional view of the assembled liquid activated air battery of FIG. 5 along the line VI-VI. In FIG. 6(B), the arrows (a) and (b) denote the flow directions of a liquid component of an electrolyte and oxygen-containing gas respectively. The same components as those of the above-described first to third embodiments are referred to by the same reference signs, and the descriptions thereof are omitted.

As illustrated in FIGS. 5 and 6, the assembled liquid activated air battery 100 of the fourth embodiment includes a plurality of liquid activated air batteries 1‴ that are laminated with each other (in the figures, two liquid activated air batteries).

Each of the liquid activated air batteries 1‴ includes: a housing 10 including an electrode assembly holding portion 11 and an electrode assembly absent portion 12 therein; an electrode assembly 21 placed inside the housing 10, including a cathode 21A, an anode 21B and a separator 21C; a liquid component 22 of an electrolyte of the air battery 1 placed inside the housing 10; a liquid-tight/gas-permeable member 13 placed inside the housing 10 in such a way the liquid-tight/gas-permeable member faces the cathode 21A; a liquid supply controller 30 provided in the housing 10; and an oxygen-containing gas supply controller 40 provided in the housing 10.

The liquid-tight/gas-permeable member 13 is made of water repellant porous resin, which is one of the exemplary materials, and partitions at least a part of the inside of the housing 10 into the electrode holding portion 11 where the electrode assembly 21 is held and the electrode absent portion 12 where the electrode assembly 21 is not held.

The electrode assembly holding portion 12 serves as a liquid container 12A to store a liquid electrolyte (electrolytic solution) E, which is an example of the liquid component 22 (see FIG. 2(A)).

The liquid supply controller 30 is composed of a channel 31 and a valve 32, and controls supply of the electrolytic solution E from the liquid container 12A to the electrode assembly 21 by opening/closing the valve 32.

Further, after the electrolytic solution E is supplied to the electrode assembly 21, the electrode assembly absent portion 12 serves as the gas flowing member 12B through which the oxygen-containing gas flows (see FIG. 2(B)).

The oxygen-containing gas supply controller 40 is composed of an air vent valve 41, and controls supply of the oxygen-containing gas G from the outside of the housing 10 to the gas flowing member 12B.

With this configuration, the liquid container to store the electrolytic solution of the electrolyte of the air battery before injection can be diverted to the gas flowing member to supply the oxygen-containing gas after injection. As a result, the assembled liquid activated air battery can be reduced in size.

Further, this configuration enables proper arrangement of the electrode assembly and the space that serves as the liquid container before injection and also serves as the gas flowing member after injection. As a result, the assembled liquid activated air battery can be reduced in size.

Further, with this configuration, the single space can serve as both of the liquid container before injection and the gas flowing member after injection. As a result, the assembled liquid activated air battery can be reduced in size.

Next, a method of using a liquid activated air battery or an assembled liquid activated air battery according to an embodiment of the present invention will be described in detail.

The method of using a liquid activated air battery or an assembled liquid activated air battery of this embodiment is a method of using the liquid activated air battery or the assembled liquid activated air battery of any of the above-described embodiments, and the method includes the steps of: supplying an electrode assembly with a liquid component of an electrolyte of the air battery from a liquid container to store the liquid component before injection; and thereafter supplying the liquid container with oxygen-containing gas of an active substance of the air battery when an amount of the liquid component in the liquid container reaches a predetermined level, wherein the liquid container also serves as a gas flowing member through which the oxygen-containing gas flows.

By the usage according to this method, the single space can serve as both of the liquid container before injection and the gas flowing member after injection. As a result, the liquid activated air battery and the assembled liquid activated air battery can be reduced in size.

It is preferred that the remainder of the liquid component in the liquid container is discharged before activation (power generation). If the liquid component is left on the liquid-tight/gas-permeable member of the liquid container, which will serves as the gas flowing member, it inhibits power generation of the air battery. For this reason, it is preferred that, for example, the oxygen-containing gas supply controller increases the amount of gas supply to blow the liquid off, or the oxygen-containing gas supply controller supplies comparatively warm gas to dry up the liquid, so that the liquid is discharged.

While the present invention is described with reference to some embodiments, it is not limited thereto, and changes and modifications may be made without departing from the gist of the present invention.

For example, the configurations of the above-described embodiments are not limited to their original embodiments. For example, the liquid component of the electrolyte may be either electrolytic solution itself or solvent (with a separately provided electrolytic salt).

REFERENCE SIGNS LIST 1, 1', 1" and 1'" liquid activated air battery
10 housing
11 electrode assembly holding portion
12 electrode assembly absent portion
12A liquid container
12B gas flowing member
13 liquid-tight/gas-permeable member
21 electrode assembly
21A cathode
21B anode
21C separator
22 liquid component
30 liquid supply controller
31 channel
32 valve
33 cut-off channel
34 sliding valve
40 oxygen-containing gas supply controller
41 air vent valve
100 assembled liquid activated air battery
E liquid electrolyte
G oxygen-containing gas
S solvent
SE electrolytic salt

The invention claimed is:

1. A liquid activated air battery, comprising:
   a housing having an interior comprising an electrode assembly holding portion and an electrode assembly absent portion; and
   an electrode assembly comprising a cathode and an anode, the electrode assembly disposed within the electrode assembly holding portion of the housing,
   wherein the electrode assembly absent portion is configured to serve as a liquid container to store a liquid component of an electrolyte of the air battery before the liquid component of the electrolyte is supplied to the electrode assembly, and
   wherein the electrode assembly absent portion is configured to serve as a gas flowing member though which oxygen-containing gas of an active material of the air battery flows after liquid component of the electrolyte is supplied to the electrode assembly.

2. The liquid activated air battery according to claim 1, further comprising a liquid-tight/gas-permeable member placed on a surface of the cathode, the liquid-tight/gas permeable member separating the interior of the housing into the electrode assembly holding portion and the electrode assembly absent portion.

3. The liquid activated air battery according to claim 2, wherein the liquid-tight/gas-permeable member is made of water-repellent porous resin.

4. The liquid activated air battery according to claim 3, wherein the water-repellant porous resin contains at least one of polyolefin or fluororesin.

5. The liquid activated air battery according to claim 1, further comprising:
   a liquid supply controller configured to supply the electrode assembly with the liquid component of the electrolyte stored in the electrode assembly absent portion; and
   an oxygen-containing gas supply controller configured to supply an oxygen-containing gas when an amount of the liquid component of the electrolyte in the electrode assembly absent portion reaches a predetermined level.

6. The liquid activated air battery according to claim 1, wherein the liquid component of the electrolyte is a liquid electrolyte.

7. The liquid activated air battery according to claim 1, wherein the liquid component of the electrolyte contains water.

8. The liquid activated air battery according to claim 1, wherein the anode contains an anode active material comprising a simple substance or alloy of a base metal that has a normal electrode potential lower than a normal electrode potential of hydrogen.

9. The liquid activated air battery according to claim 8, wherein the simple substance or alloy of the base metal contains at least one element selected from the group consisting of zinc, iron, aluminum, magnesium, manganese, silicon, titanium, chromium and vanadium.

10. The liquid activated air battery according to claim 1, wherein the liquid component is a solvent, and the electrolyte of the air battery further comprises an electrolytic salt component, the electrolytic salt component being placed inside at least one of the housing or the liquid supply controller.

11. An assembled liquid activated air battery, comprising a plurality of the liquid activated air battery according to claim 1.

12. A liquid activated air battery comprising:
a housing;
a liquid-tight/gas-permeable member placed inside the housing such that the liquid-tight/gas permeable member partitions at least a part of an inside of the housing into an electrode assembly holding portion and an electrode assembly absent portion;
an electrode assembly comprising a cathode and an anode, the electrode assembly placed in the electrode assembly holding portion;
a liquid supply controller provided in the housing, the liquid supply controller configured to inject a liquid component of an electrolyte of the air battery into the electrode assembly; and
an oxygen-containing gas supply controller provided in the housing, the oxygen-containing gas supply controller configured to control a supply of an oxygen-containing gas from an outside of the housing to the electrode assembly absent portion,
wherein before the liquid component is injected into the electrode assembly by the liquid supply controller, the electrode assembly absent portion serves as a liquid container to store the liquid component of the electrolyte of the air battery, and
wherein after the liquid component is injected into the electrode assembly by the liquid supply controller, the electrode assembly absent portion serves as a gas flowing member through which the oxygen-containing gas flows.

13. The liquid activated air battery according to claim 12, wherein the liquid component of the electrolyte is a solvent, and the electrolyte of the air battery further comprises an electrolytic salt component, the electrolytic salt component being placed inside at least one of the housing or the liquid supply controller.

14. The liquid activated air battery according to claim 12, wherein the liquid-tight/gas-permeable member is made of water-repellent porous resin.

15. The liquid activated air battery according to claim 14, wherein the water-repellant porous resin contains at least one of polyolefin or fluororesin.

16. The liquid activated air battery according to claim 12, wherein the anode contains an anode active material comprising a simple substance or alloy of a base metal that has a normal electrode potential lower than a normal electrode potential of hydrogen.

17. The liquid activated air battery according to claim 16, wherein the simple substance or alloy of the base metal contains at least one element selected from the group consisting of zinc, iron, aluminum, magnesium, manganese, silicon, titanium, chromium and vanadium.

18. An assembled liquid activated air battery, comprising a plurality of the liquid activated air battery according to claim 12.

19. A method of using the liquid activated air battery according to claim 1, comprising the steps of:
storing the liquid component of the electrolyte of the air battery in the electrode assembly absent portion;
supplying the electrode assembly with the liquid component of the electrolyte of the air battery from the electrode assembly absent portion; and
thereafter supplying the electrode assembly absent portion with oxygen-containing gas when the amount of the liquid component of the electrolyte in the electrode assembly absent portion reaches a predetermined level.

20. The method of using the liquid activated air battery according to claim 19, further comprising discharging a remainder of the liquid component in the electrode assembly absent portion.

* * * * *